US008588394B2

(12) United States Patent
Schlesener et al.

(10) Patent No.: US 8,588,394 B2
(45) Date of Patent: Nov. 19, 2013

(54) CONTENT SWITCH FOR ENHANCING DIRECTORY ASSISTANCE

(75) Inventors: Matthew C. Schlesener, Olathe, KS (US); Pallavur Sankaranaraynan, Overland Park, KS (US); Brian D. Mauer, Shawnee, KS (US); Stevan A. Klesper, Gardner, KS (US); Lyle Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1366 days.

(21) Appl. No.: 11/534,606

(22) Filed: Sep. 22, 2006

(65) Prior Publication Data
US 2008/0084987 A1 Apr. 10, 2008

(51) Int. Cl.
*H04M 3/42* (2006.01)
*H04L 29/06* (2006.01)

(52) U.S. Cl.
USPC ................................ 379/218.01; 455/414.3

(58) Field of Classification Search
USPC ........ 379/218.01, 218.02, 218; 455/414, 403, 455/456.6, 457, 456.3, 414.2, 414.3, 404.2, 455/414.4, 433, 456, 556; 709/229, 225; 370/352, 353, 354, 355, 356, 357
See application file for complete search history.

(56) References Cited

U.S. PATENT DOCUMENTS

| | | | | |
|---|---|---|---|---|
| 5,784,561 A * | 7/1998 | Bruno et al. | ................... | 709/204 |
| 5,936,662 A * | 8/1999 | Kim et al. | ................... | 348/14.09 |
| 6,704,769 B1 | 3/2004 | Comstock | | |
| 6,788,769 B1 | 9/2004 | Waites | | |
| 6,944,447 B2 * | 9/2005 | Portman et al. | ............ | 455/422.1 |
| 7,245,926 B2 * | 7/2007 | Liao et al. | ................... | 455/456.3 |
| 7,366,523 B2 * | 4/2008 | Viikari et al. | ............... | 455/456.1 |
| 7,475,140 B2 * | 1/2009 | Requena | ........................ | 709/225 |
| 7,509,124 B2 * | 3/2009 | O'Neil | ........................ | 455/432.2 |
| 2002/0049049 A1 * | 4/2002 | Sandahl et al. | ................. | 455/414 |
| 2002/0055351 A1 * | 5/2002 | Elsey et al. | ..................... | 455/414 |
| 2003/0032409 A1 * | 2/2003 | Hutcheson et al. | ............ | 455/414 |
| 2003/0040324 A1 * | 2/2003 | Eldering et al. | ............... | 455/456 |
| 2003/0065779 A1 | 4/2003 | Malik | | |
| 2003/0216145 A1 * | 11/2003 | Cox et al. | ..................... | 455/456.1 |
| 2004/0166832 A1 * | 8/2004 | Portman et al. | ............ | 455/412.1 |
| 2004/0176105 A1 * | 9/2004 | Ashmore et al. | ............ | 455/456.3 |
| 2004/0226048 A1 * | 11/2004 | Alpert et al. | ..................... | 725/109 |
| 2004/0230689 A1 * | 11/2004 | Loveland | ........................ | 709/229 |
| 2004/0240655 A1 * | 12/2004 | Swick | ........................ | 379/218.01 |
| 2004/0253965 A1 * | 12/2004 | Sato et al. | ................... | 455/456.3 |

(Continued)

OTHER PUBLICATIONS

Foreign Search Report, Jan. 30, 2008.

(Continued)

*Primary Examiner* — Fan Tsang
*Assistant Examiner* — Kharye Pope

(57) ABSTRACT

A method, medium, and content switch device are provided for enhanced directory assistance. A GPS-enabled wireless phone generates directory assistance requests that are monitored and processed by the content switch and a directory assistance platform to generate results that satisfy the directory assistance requests. The content switch intelligently monitors the directory assistance sessions and dynamically invokes value-adding services that delivers rich content in addition to the results to the GPS-enable wireless phone or other registered client devices based on the directory assistance requests or results. The value-adding services may include pushing driving directions to the GPS-enable wireless phone, providing training video content corresponding to vendors associated with the directory assistance requests, or connecting the GPS-enabled wireless phone to a live video-conferencing session.

20 Claims, 5 Drawing Sheets

(56) References Cited

U.S. PATENT DOCUMENTS

| | | | |
|---|---|---|---|
| 2005/0018822 A1* | 1/2005 | Bruce et al. | 379/88.18 |
| 2005/0021666 A1* | 1/2005 | Dinnage et al. | 709/217 |
| 2005/0054333 A1* | 3/2005 | Johnson | 455/414.3 |
| 2005/0096020 A1* | 5/2005 | Oesterling et al. | 455/414.2 |
| 2005/0136916 A1* | 6/2005 | Pines et al. | 455/428 |
| 2005/0143097 A1* | 6/2005 | Wilson et al. | 455/456.3 |
| 2005/0187852 A1* | 8/2005 | Hwang | 705/36 |
| 2005/0198299 A1* | 9/2005 | Beck et al. | 709/226 |
| 2005/0207357 A1* | 9/2005 | Koga | 370/260 |
| 2006/0057956 A1* | 3/2006 | Grau et al. | 455/3.02 |
| 2006/0093120 A1* | 5/2006 | Thorpe et al. | 379/218.01 |
| 2006/0245576 A1* | 11/2006 | Henry | 379/265.01 |
| 2007/0023683 A1* | 2/2007 | Kai et al. | 250/441.11 |
| 2007/0047491 A1* | 3/2007 | Dutta et al. | 370/331 |
| 2007/0081662 A1* | 4/2007 | Altberg et al. | 379/355.03 |
| 2007/0093238 A1* | 4/2007 | Lin | 455/416 |
| 2007/0130026 A1* | 6/2007 | O'Pray et al. | 705/27 |
| 2007/0223683 A1* | 9/2007 | Pearson | 379/355.01 |
| 2007/0242661 A1* | 10/2007 | Tran | 370/352 |

OTHER PUBLICATIONS

Minder Chen et al., "Providing Web Services to Mobile Users: The Architecture Design of an M-Service Portal," International Journal of Mobile Communications, vol. 3, No. 1, 2005, pp. 1-18.

Pär Landor, "Understanding the Foundation of Mobile Content Quality—A Presentation of a New Research Field," Proceedings of the 36th Annual Hawaii International Conference on System Sciences (HICSS'03), Jan. 6-9, 2003, Big Island, Hawaii.

\* cited by examiner

CONTENT SWITCH FOR ENHANCING DIRECTORY ASSISTANCE

BACKGROUND

Often, the infrastructure of existing legacy systems is not readily compatible with the infrastructure of new web services. For instance, a legacy directory-assistance system conventionally operates over a public switched telephone network (PSTN). FIG. 1 is a network diagram that illustrates a conventional directory assistance system 100. The prior art directory-assistance system 100 includes a PSTN 110, a telephone 111, a directory assistance platform (DAP) 112.

Conventionally, a user operating the telephone 111 initiates a directory assistance call by depressing a numerical pattern, such as "411," on the telephone 111 to retrieve information associated with a specified entity. In turn, the conventional directory-assistance system 100 connects the telephone 111 to the DAP 112 and provides results that includes directory listings based on requests generated by the telephone 111. The conventional directory-assistance system 100, generates audible results that are related to the specified entity. For instance, the audible results may include contact information for the specified entity. The results do not provide a user with web services associated with the specified entity because the conventional infrastructure of the directory-assistance system 100 is not configured to communicate with web services associated with the specified entity. Thus, there is a need to leverage functionality of the existing legacy infrastructure, in order to provide telecommunication devices with richer results based on optional web services that are associated with the entities specified in the directory-assistance call.

SUMMARY

The present invention is defined by the claims below. Embodiments of the present invention solve at least the above problems by providing media, methods, and a content switch for, among other things, enhanced-directory assistance services, such as telephone-conferencing, video-conferencing, navigation, instant messages, and online shopping. The present invention has several practical applications in the technical arts including managing communication sessions associated with directory assistance requests and integrating legacy directory assistance systems with IP based functionality when providing content in response to the directory assistance requests.

In a first aspect, user requests for directory information are processed to establish SIP communication sessions between a directory assistance platform and a content switch. The directory assistance platform queries a client device to select a delivery location and format for results that are related to the user requests. When the results are generated and delivered to the selected location, the session is transferred to the content switch to initiate enhanced-directory-assistance services associated with the user request.

In a second aspect, the user requests are generated by client devices that are registered with the content switch. The content switch stores data corresponding to each registered client device in a registration database. The registered client devices send directory assistance requests to the directory assistance platform, which generates and delivers results to the registered client devices. In turn, the registered client devices are provided with enhanced-directory assistance services based on the directory assistance requests or results provided in response to the directory assistance requests.

In a third aspect, a content switch that manages communication sessions includes a memory, processor and at least two communication interfaces. The memory stores instruction for monitoring and managing communication sessions among a directory assistance platform, the content switch, and an IP network. The at least two communication interfaces communicatively connects the content switch to the IP network and a SMS center. Additionally, the content switch may include a registration database that provides data associated with registered client devices that generate directory assistance requests. In turn, the processor executes the instruction stored in memory and provides enhanced-directory-assistance services in response to the directory assistance request.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
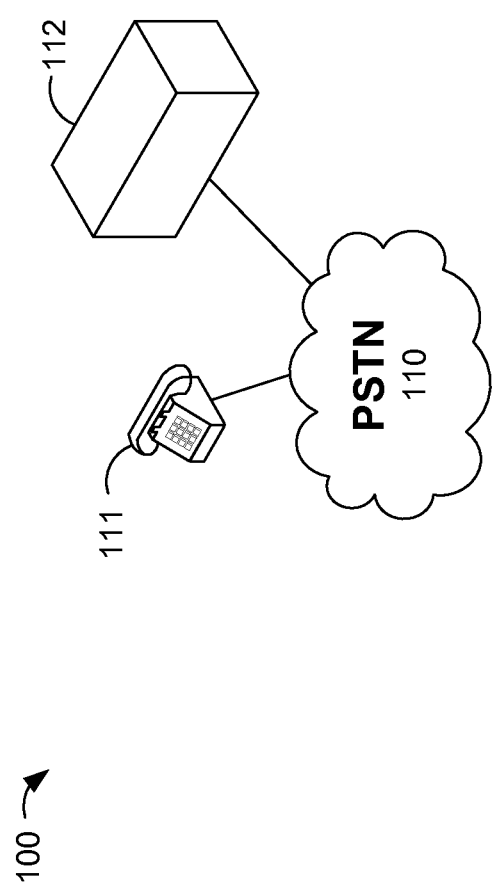
FIG. 1 is a network diagram that illustrates a prior art directory assistance system.

Embodiments of the present invention provide a content switch, method, and media for providing enhanced-directory services associated with entities specified in directory assistance requests generated by a mobile phone. Content associated with the entities may be delivered to the mobile phone that generated the directory assistance request or to another specified device. The directory assistance request is monitored by a content switch, which injects the enhanced-directory services based on the entities specified in the directory requests.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

BSC Base Station Controller
BTS Base Transceiver Station
CS Content Switch
DAP Directory Assistance Platform
GPS Global Positioning System
IP Internet Protocol
ISCP Intelligent Service Control Point
IVR Interactive Voice Recognition MGC Media Gateway Controller
MSC Mobile Switching Center
PSTN Public Switched Telephone Network
SIP Session Initiation Protocol
SMS Short Message Service
SMSC Short Message Service Center As utilized herein, the term "component" refers to any combination of hardware, software, and firmware. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 2:
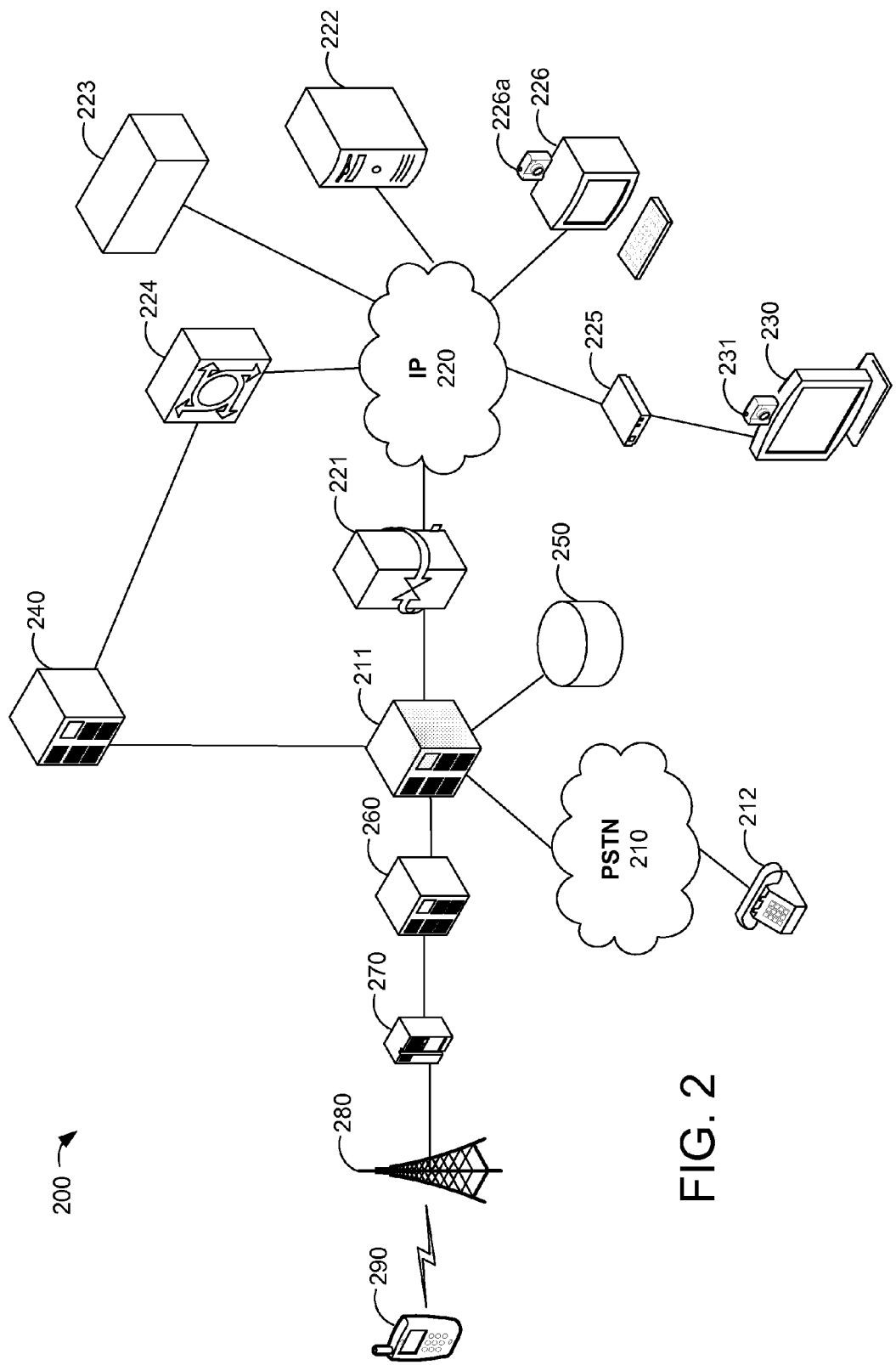
FIG. 2 is a network diagram that illustrates an exemplary wireless operating environment that provides enhanced-directory-assistance services, according to an embodiment of the present invention.

In an embodiment, a wireless operating environment may include a content switch that manages communication session associated with the directory assistance requests and provides enhanced-directory-assistance services based on the user requests. The wireless operating environment may include an internet protocol (IP) network that provides access to content providers and corresponding web services. FIG. 2 is a network diagram that illustrates an exemplary wireless operating environment that provides enhanced-directory-assistance services, according to an embodiment of the present invention. One of ordinary skill in the art appreciates that wireless operating environment 200 has been simplified to illustrate key features of embodiments of the present invention.

In FIG. 2, the wireless operating environment 200 includes a PSTN network 210, a MSC 211, a telephone 212, an IP network 220, a media gateway controller (MGC) 221, a content provider 222, a DAP 223, a content switch 224, a broadband modem 225, a call center 226 configured with a multimedia capture device 226a, a display device 230 configured with a multimedia capture device 231, a SMSC 240, an ISCP 250, a BSC 260, a BTS 270, a cell tower 280, and a mobile phone 290.

The PSTN 210 connects the telephone 212 and the MSC 211. The PSTN 210 provides connectivity between the telephone 212 and the other telephone addressed on the PSTN 210. The PSTN 210 may provide duplex communications between the telephone 212 and any other telephone on the PSTN 210. The mobile phone 290 may generate mobile communications that are destined for other mobile devices or for telephones connected to the PSTN 210. The PSTN 210 connects to the MSC 211 to enable bidirectional communication between the mobile phone 290 and telephone 212.

The MSC 211 interfaces with the PSTN 210 and routes mobile communications destined for a telephone 212 or other mobile device. The MSC 211 performs mobility management which enables the mobile phone 290 to stay connected while in transit. Moreover, the MSC 211 may connect to the MGC 221 or BSC 260 when processing the mobile communication. The MSC 211 performs appropriate address and format translations for mobile communications that terminate at the telephone 212.

The telephone 212 is configured to communicate with the PSTN 210 when initiating a telephone call to a mobile phone 290 or another telephone connected to the PSTN 210. The telephone 212 transfers and receives modulated signals the represent voice input on the PSTN 210. In an embodiment, the telephone 212 enables a user to initiate directory assistance requests and receive the results associated with the directory assistance requests.

The MGC 221 is connected to the IP network 220 and performs signaling and session management for multimedia communications. Also, the MGC 221, configured as a Media Gateway/Media Gateway Controller, converts the session communications from the format required for a circuit-switched network, such as the PSTN 210, to that required for a packet-switched network, such as the IP network 220. The MGC 221 enables mobile phone 290 or telephone 212 to receive multimedia content, including video, images, text, and audio. Also, the MGC 221 enables the mobile phone 290 or telephone 212 to participate in multimedia conferences, such as video-conferencing and telephone-conferencing.

The content provider 222 is connected to the IP network and provides content or web services or enhanced-directory-assistance services for an entity. The content provider 222 may transmit multimedia, such as a video, image, audio, or text to the mobile phone 290, telephone 212, display device 230 or any other specified device. In some embodiments, the content switch 224 communicates with the content provider 222 to invoke enhanced-directory services for an entity specified in a directory assistance request. For instance, a content provider 222 that is associated with a hardware supply store may provide web services, such as product tutorials. When a mobile phone 290 generates a directory assistance request for a hardware supply store, the results include the hardware supply store and a product tutorial that is of interest to the user of the mobile phone 290. The web services associated with the hardware supply store are invoked to provide the mobile phone 290 with multimedia corresponding to the product tutorial.

The DAP 223 is connected to the IP network 220 and processes the directory assistance requests to generate results having listings for specified entities. The DAP 223 includes an interactive voice recognition (IVR) component that queries the users of the mobile phone 290 to define additional criteria for the directory assistance request. Also, the DAP 223 interrogates the user to receive a delivery format associated with the results. The DAP 223 transmits the results to the content switch 224, which dynamically invokes enhanced-directory-assistance services based on the directory assistance request or the results.

The content switch 224 manages the communication session associated with the directory assistance requests. In an embodiment, the communication sessions associated with content switch 224 utilizes a session initiation protocol (SIP) to communicate with the other devices on the IP network, such as, i.e., DAP 223, content provider 222, and MGC 221. In an embodiment of the present invention, the directory assistance requests and results are monitored by the content switch 224. The content switch 224 invokes the appropriate enhanced-directory-assistance services and communicates the corresponding results and content to the mobile phone 290 or other appropriate device.

The broadband modem 225 is connected to the IP network 220 and may communicate the results or content to a display device 230 configured with a multimedia capture device 231. The multimedia capture device 231 may be a digital camera, a video camera, or microphone. The display device 230 is connected to the broadband modem 225 to receive or transmit information. In an embodiment, the display device 230 is configured with a multimedia capture device 231 to enable participation in a video-conference session.

The call center 226 is connected to the IP network 220 and configured with a multimedia capture device 226a. The multimedia capture device 226a may be a digital camera, a video camera, or microphone. In an embodiment, the call center 226 may provide listings associated with user request. Additionally, the call center may utilize the multimedia capture device 226a to participate in a telephone-conference or video-conference session. The content switch 224 may utilize the enhanced directory services to provide the video-conferencing for a directory assistance request.

The SMSC 240 is connected to the MSC 211 and the content switch 224 and generates SMS messages that are transmitted to the mobile phone 290. The DAP 223 interrogates the user of the mobile phone 290 to determine whether the results are delivered in SMS format. After the user selects the SMS format for the results, the results are transmitted to the SMSC 240 and packaged in a SMS message. In turn, the SMS message is transmitted to the mobile phone 290 or another location specified by the user.

The ISCP 250 is connected to the MSC 211 and provides an identifier or location associated with the DAP 223, in response to a directory assistance request. The MSC 211 utilizes the identifier or location to route the directory assistance request to the DAP 223. In certain embodiments, the mobile phone 290 generates a directory assistance request that is communicated to MSC 211 via the cell tower 280, BTS 270, and BSC 260. In some embodiments, the mobile phone 290 is a global positioning system (GPS) enabled device.

Accordingly, the wireless operating environment 200 provides a mobile phone 290 that generates directory assistance requests. In response, to the directory assistance requests a DAP 223 generates results and the content switch 224 invokes enhanced-directory assistance services to augments the results with multimedia content.

In certain embodiments of the present invention, a content switch monitors and manages communication sessions associated with directory assistance requests. The content switch includes a memory, processor, and at least two interfaces. In an embodiment, the memory is loaded with instructions associated with invoking enhanced-directory-assistance services to augment results associated with the directory assistance request. The content switch may include a registration database that stores registered client devices, such as a mobile phone, laptop, display device, etc. In one embodiment, the content switch verifies that a device is registered prior to invoking the enhanced-directory-assistance services.

Figure 3:
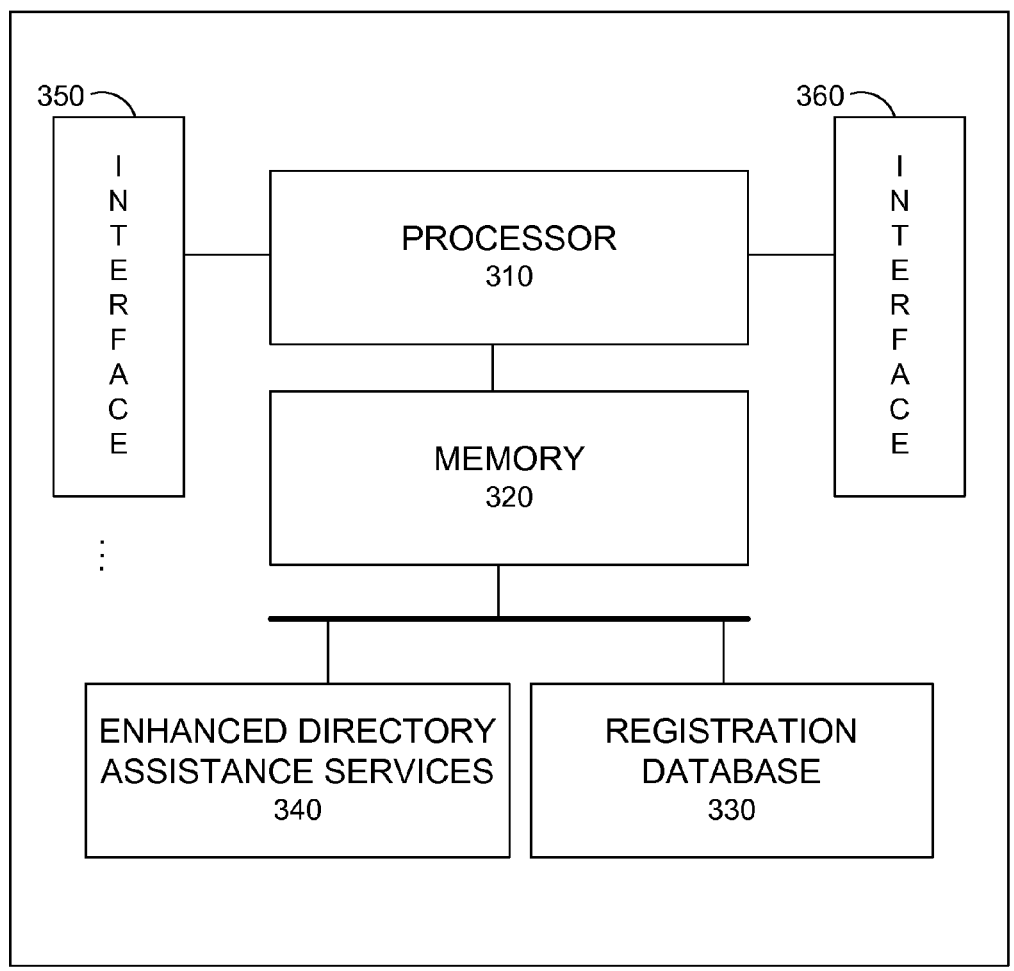
FIG. 3 is a component diagram that illustrates an exemplary content switch utilized to manage communication sessions, according to an embodiment of the present invention.

FIG. 3 is a component diagram that illustrates an exemplary content switch 300 utilized to manage communication sessions, according to an embodiment of the present invention. The content switch 300 includes a processor 310, a memory 320, registration database 330, enhanced-directory-assistance services 340, and communication interfaces 350 and 360. The processor 310 executes the logic stored in memory 310. Optionally, the registration database 330 stores information about client devices that are registered with the content switch 300. In some embodiments, the registration database is queried to filter requests associated with clients that are not registered. That is, when a client is not registered the results are not augmented with content from the enhanced-directory-services 340. In an alternative embodiment, the content switch may augment results for all directory assistance requests without regard to whether mobile device is registered. The enhanced-directory-assistance services 340 provides instructions that are loaded into memory when the content switch 300 augments results corresponding to the directory assistance requests.

The enhanced-directory-assistance services 340 include web services that associated with an entity. The enhanced-directory-assistance services 340 may be provided by a content provider that stores multimedia for the entity. The enhanced-directory services 340 may provide navigation, online shopping, instant messaging, video-conferencing, telephone-conferencing, or any other type of multimedia content that supplements a listing associated with the entity specified in the directory assistance request.

The mobile phone generates a directory assistance request and utilizes a DAP, a content switch, and content provider to receive results and content related to the results or the directory assistance requests. The MSC, MGC and content switch control and transform the communication sessions associated with a directory assistance session.

Figure 4:
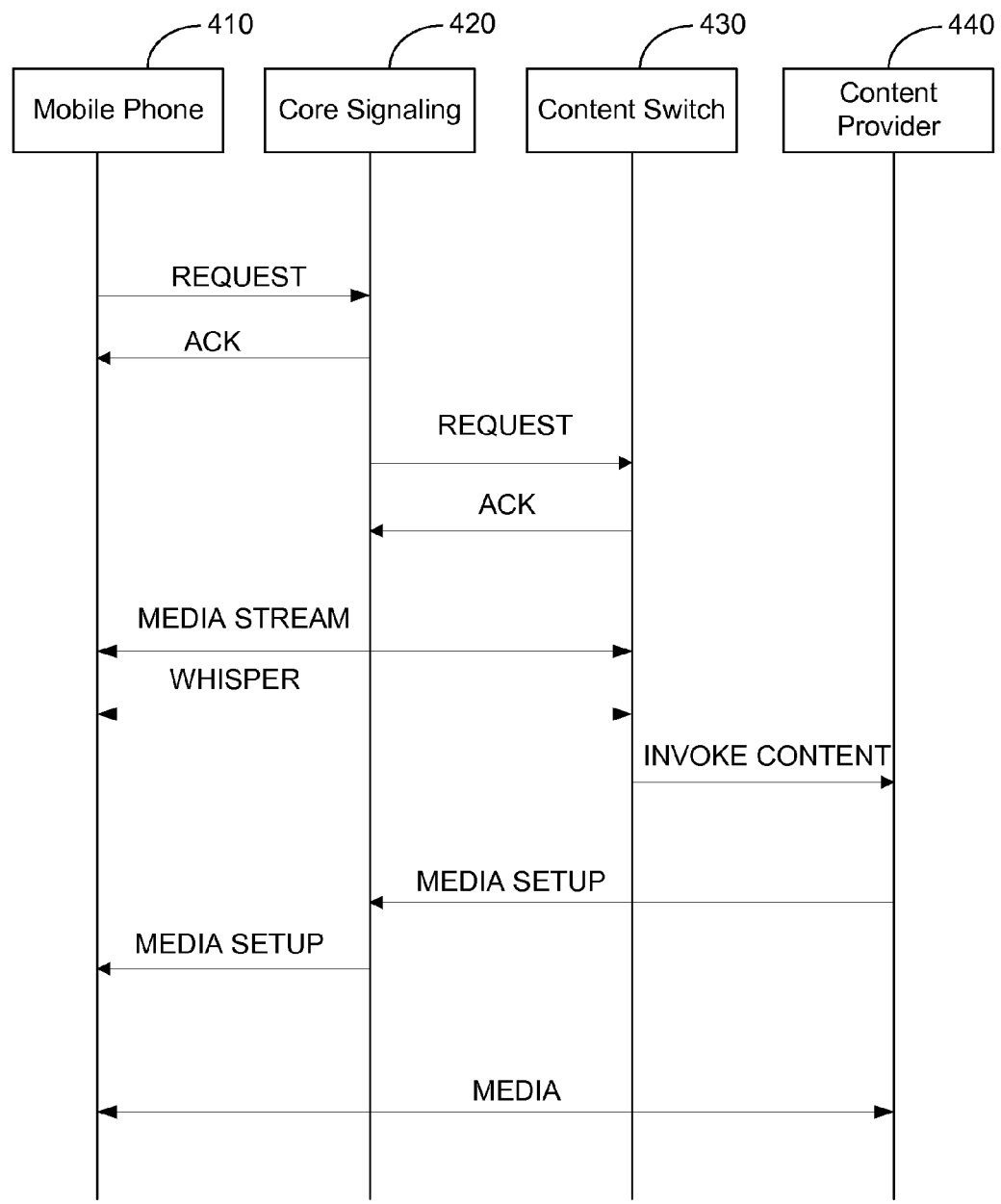
FIG. 4 is a message flow diagram that illustrates exemplary communication messages exchanged, during a directory assistance session, according to an embodiment of the present invention.

FIG. 4 is a message flow diagram that illustrates exemplary communication messages exchanged, during a directory assistance session, according to an embodiment of the present invention. A mobile phone 410 or other wireless device generates a directory assistance request that is transmitted to core signaling devices 420 such as MSC and MGC. In some embodiments, the request may include specified criteria such as state, city or entity name. In alternative embodiments, the request does not identify criteria for the directory assistance request but the request indicates the criteria will be provided during interrogation by the IVR component. After receiving the directory assistance requests, the core signaling devices 420 generate an acknowledgement. In turn, the core signaling devices 420 transform the directory assistance requests to the appropriate format, such as SIP, and transmits the transformed directory assistance requests to the content switch 430. The content switch 430 processes the directory assistance requests and invokes enhanced-directory-assistance services based the on the directory assistance request generated by the mobile phone 410. In some embodiments, the format associated with the directory assistance request or specified criteria of the directory assistance request are utilized to invoke the enhanced-directory-assistance services that provide content corresponding to the directory assistance request. The enhanced-directory-assistance services include, video-conferencing, telephone-conferencing, instant messaging, online shopping and navigation. The content switch 430 creates a communication session with the mobile device 410 by sending an open media stream message and a whisper message that informs the mobile phone 410 to prepare to receive multimedia content during a encrypted communication session. After the content switch 430 opens the secure communication session, the content switch 430 informs the content provider 440 to provide the content to the mobile phone 410 by sending a invoke content message. In turn, the content provider 440 transmits a media setup message that is processed and formatted by the core signaling devices before being sent to the mobile phone 410. The content provider 440 communicates the content associated with enhanced-directory-assistance services to the mobile phone 410 and utilizes the encryption indicated in the whisper message.

In some embodiments, the content switch 430 communicates with a DAP to refine the directory assistance request. The DAP may interrogate a user to provide information that completes the directory assistance requests. In an embodiment, the content switch 430 may process the criteria provided in response to the interrogation by the DAP to invoke the enhanced-directory services. Alternatively, a call center may provide results associated with the directory assistance requests, and the content switch 430 may process the results to invoke the appropriate enhanced-directory-assistance requests.

Figure 5:
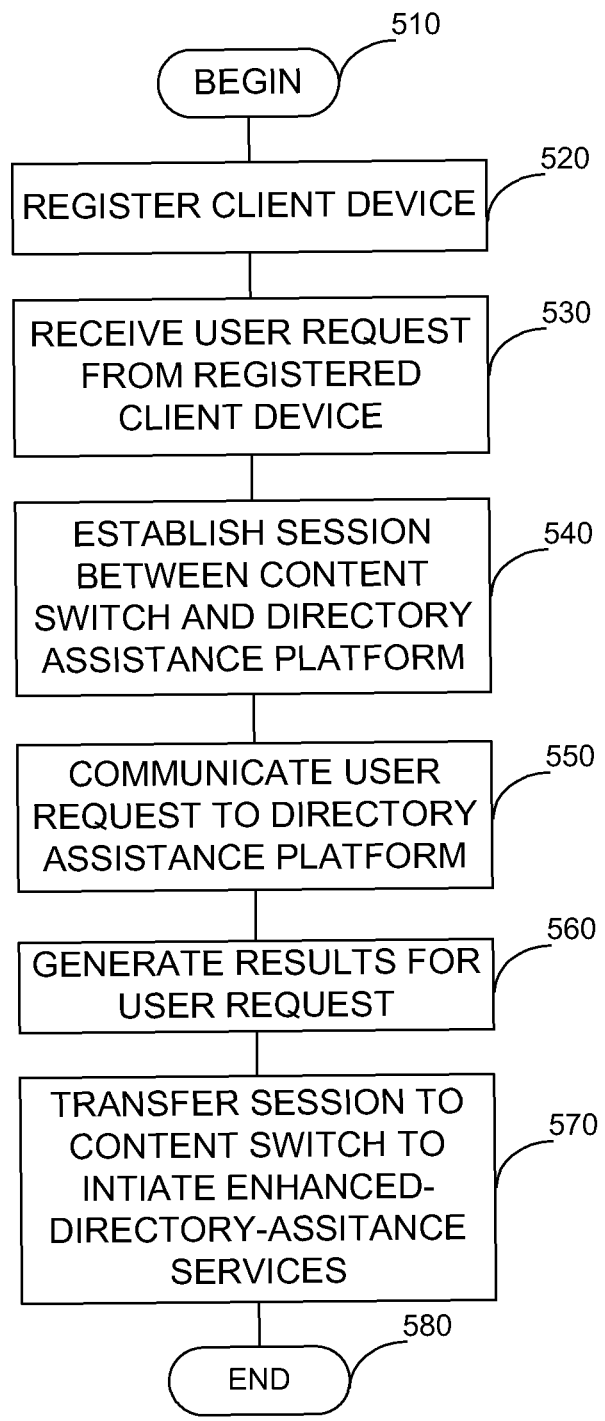
FIG. 5 is a logic diagram that illustrates an exemplary method for managing directory assistance requests, according to an embodiment of the present invention.

In some embodiments, the directory assistance requests are utilized to invoke enhanced-directory-assistance services that provide content related to the directory assistance requests. FIG. 5 is a logic diagram that illustrates an exemplary method for managing directory assistance requests, according to an embodiment of the present invention. The method begins, in step 510. In certain embodiments, the client device, such as mobile phone is registered with a content switch, in step 520. A user utilizes the client device to generate a directory assistance request, in step 530. A directory assistance communication session is established between the content switch and directory assistance platform, in step 540. In step 550, the directory assistance request is communicated to the directory assistance platform. The results associated with the directory assistance request are generated, in step 560. In turn, the directory assistance session is transferred to the content switch to select and execute enhanced-directory-assistance services based on the directory assistance request or the corresponding results, in step 570. The method ends in step 580.

In summary, a directory assistance request provided by a mobile phone may invoke enhanced-directory assistance services that augment results associated with the directory assistance request. A user may utilize the mobile phone to generate a directory assistance request by depressing "411" on the mobile phone keypad. The directory assistance request may specify some criteria or may indicate that criteria should be extracted by a IVR component. The directory assistance request is processed and formatted by signaling components, such as MSC and MGC. The core signaling components generates directory assistance sessions and communicates the directory assistance request to the content switch which may be utilized to invoke the enhanced-directory assistance services associated with entities specified in the directory assistance request.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon, that, when executed by a computing device, perform a method to manage directory assistance requests, the method comprising:
    receiving a user directory assistance request for directory information included in directory listings of one or more public directories, the directory assistance request initiated by a user calling an established directory assistance phone number;
    establishing a session between a content switch and a directory assistance platform,
        A) wherein the directory assistance platform processes user directory assistance requests for directory information and identifies one or more directory listings included in the one or more public directories that correspond to the user directory assistance request,
        B) wherein the content switch identifies, based on at least one of the user directory assistance request for directory information or identified directory listings corresponding to the user directory assistance request, appropriate enhanced-directory-assistance services for the user that supplement the identified directory listings;
    communicating the received user directory assistance request for directory information to the directory assistance platform;
    selecting a delivery location and format for results to the user directory assistance request for directory information, the results comprising one or more directory listings identified by the directory assistance platform;
    generating the one or more directory listings for the user directory assistance request for directory-information; and
    after generating the one or more directory listings, transferring the session to the content switch, wherein the one or more directory listings are provided to the content switch, wherein the content switch initiates an enhanced-directory-assistance service to provide multimedia content based on at least one of the user directory assistance request or the one or more directory listings, wherein the enhanced-directory-assistance service supplements the one or more directory listings with the multimedia content.

2. The media of claim 1, further comprising executing an interactive voice recognition component to refine the user directory assistance request.

3. The media of claim 1, wherein the results corresponding to the user directory assistance request include multimedia.

4. The media of claim 1, wherein the session between the content switch and directory assistance platform utilize SIP messages to transmit data between the content switch and directory platform.

5. The media of claim 1, wherein the enhanced-directory-assistance service transmits driving directions to a location specified in the user directory assistance request.

6. The media of claim 1, wherein the enhanced-directory-assistance service connects a client device that generated the user directory assistance request to an instant messaging session.

7. The media of claim 1, wherein the enhanced-directory-assistance service connects a client device that generated the user directory assistance request to a telephone-conferencing session.

8. The media of claim 1, wherein the enhanced-directory-assistance service connects a client device that generated the user directory assistance request to a videoconferencing session.

9. The media of claim 1, wherein the enhanced-directory-assistance service completes a purchase request for content generated by a content provider.

10. A computer-implemented method to deliver content in response to directory assistance requests, the method comprising:
    registering one or more client devices;
    receiving a directory assistance request from one or more of the registered client devices,
        A) wherein the directory assistance request specifies an entity for which a directory listing is requested, and
        B) wherein the directory assistance request is initiated by a user calling an established directory assistance phone number;
    generating results for the directory assistance request, the results identifying one or more directory listings corresponding to the received directory assistance request;
    providing the request and the results to a content switch that includes a registration database that stores registered client devices;
    delivering the results to the one or more registered client devices; and
    at the content switch, executing one or more enhanced-directory-assistance services that supplement the one or more identified directory listings in the results, the one or more enhanced-directory-assistance services based on a format of the directory assistance request, wherein executing the one or more enhanced-directory-assistance services includes
        A) determining, at the content switch, whether the one or more clients devices are stored in the registration database, and
        B) when the one or more devices are registered, then sending from the content switch an invoke message to a content provider associated with the entity for which the directory listing was requested, wherein the invoke message instructs the content provider to provide the enhanced directory-assistance services.

11. The computer-implemented method of claim 10, further comprising executing additional enhanced-directory-assistance services based on the results generated in response to the directory assistance request.

12. The computer-implemented method of claim 10, wherein the one or more registered client devices includes at least one of a set-top box, a wireless device, and a GPS-enabled device.

13. The computer-implemented method of claim 12, wherein the one or more registered client devices includes a profile that stores delivery preferences for the one or more registered client devices.

14. The computer-implemented method of claim 10, wherein one or more of the registered client devices that generated the directory assistance requests are wireless devices.

15. The computer-implemented method of claim 12, wherein the wireless devices are wireless phones.

16. A content switch to manage communication sessions, the content switch comprising:
    one or more non-transitory computer-readable media storing instructions that manage communication sessions associated with directory assistance requests initiated by users calling an established directory assistance phone number from a client device;
    one or more processors that execute the instructions to generate communication sessions and to invoke enhanced-directory-assistance services corresponding to the directory assistance requests, the enhanced-directory-assistance services supplementing one or more directory listings identified in response to the directory assistance requests, wherein the one or more directory listings are received at the content switch from a directory assistance platform via an IP network, and wherein invoking the enhanced-directory-assistance services includes determining, at the content switch, a content provider based on the one or more directory listings received at the content switch, and sending, via the IP network, a message from the content switch to the content provider instructing the content provider to communicate the enhanced directory-assistance services to the client device;
    a first communication interface connected to the IP network, wherein the IP network comprises:
        (A) a media gateway controller that routes the directory assistance requests to the content switch, and
        (B) the directory assistance platform that generates results based on the directory assistance requests received from the content switch, the results identifying one or more directory listings corresponding to the received directory assistance requests; and
    a second communication interface connected to a SMS center that generates SMS messages when the client device specifies a SMS as a delivery format.

17. The content switch of claim 16, wherein the enhanced-directory-assistance services include at least one of content delivery, online shopping, telephone-conferencing, videoconferencing, instant messaging, and route navigation.

18. The content switch of claim 16, wherein the IP network further comprises the content provider configured to transmit multimedia content associated with the user request.

19. The content switch of claim 16, wherein the IP network further comprises a call center configured to establish videoconferencing sessions.

20. The content switch of claim 16, wherein the IP network further comprises a broadband client device that is configured to receive results associated with the user request.

* * * * *